Figure 8:
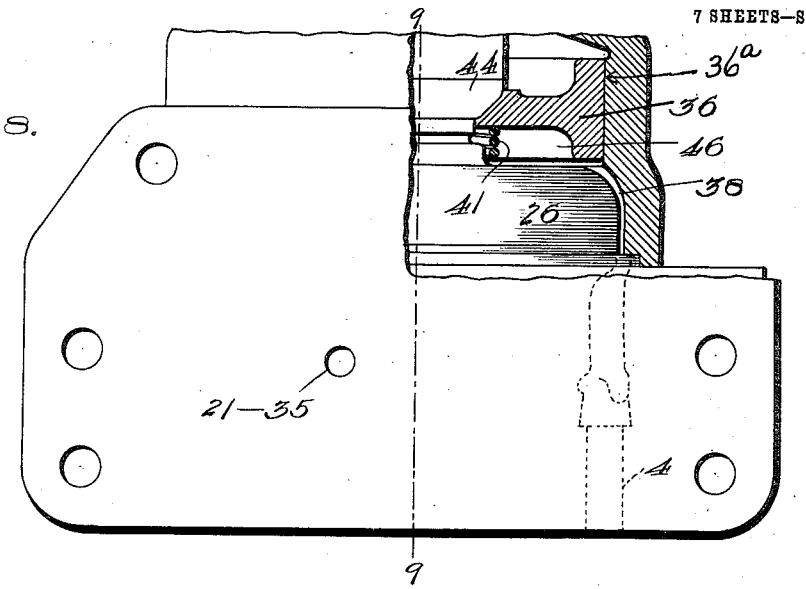

No. 847,174. PATENTED MAR. 12, 1907.
N. E. GEE.
MECHANICAL STOKER.
APPLICATION FILED MAY 7, 1906.
7 SHEETS—SHEET 1.
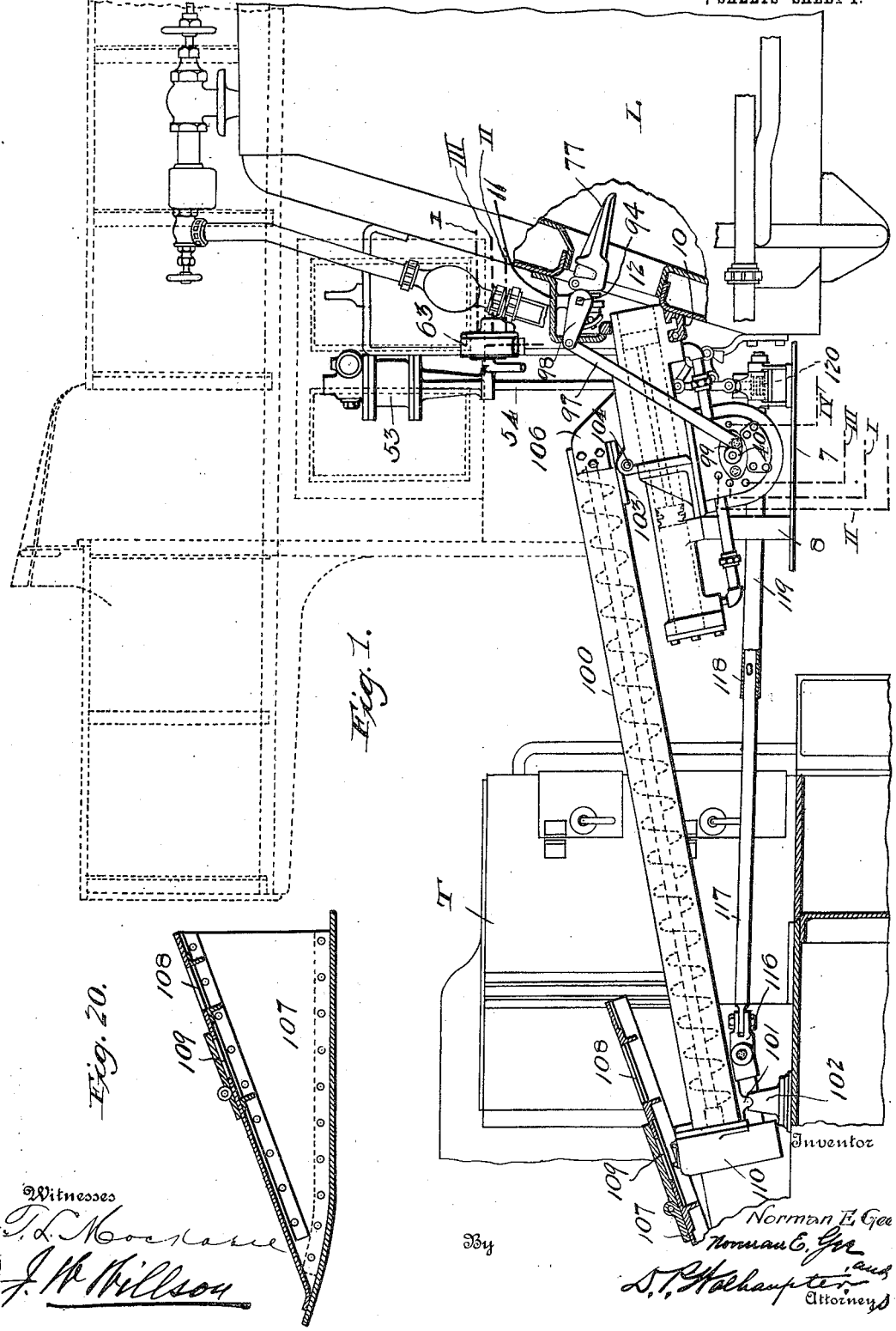

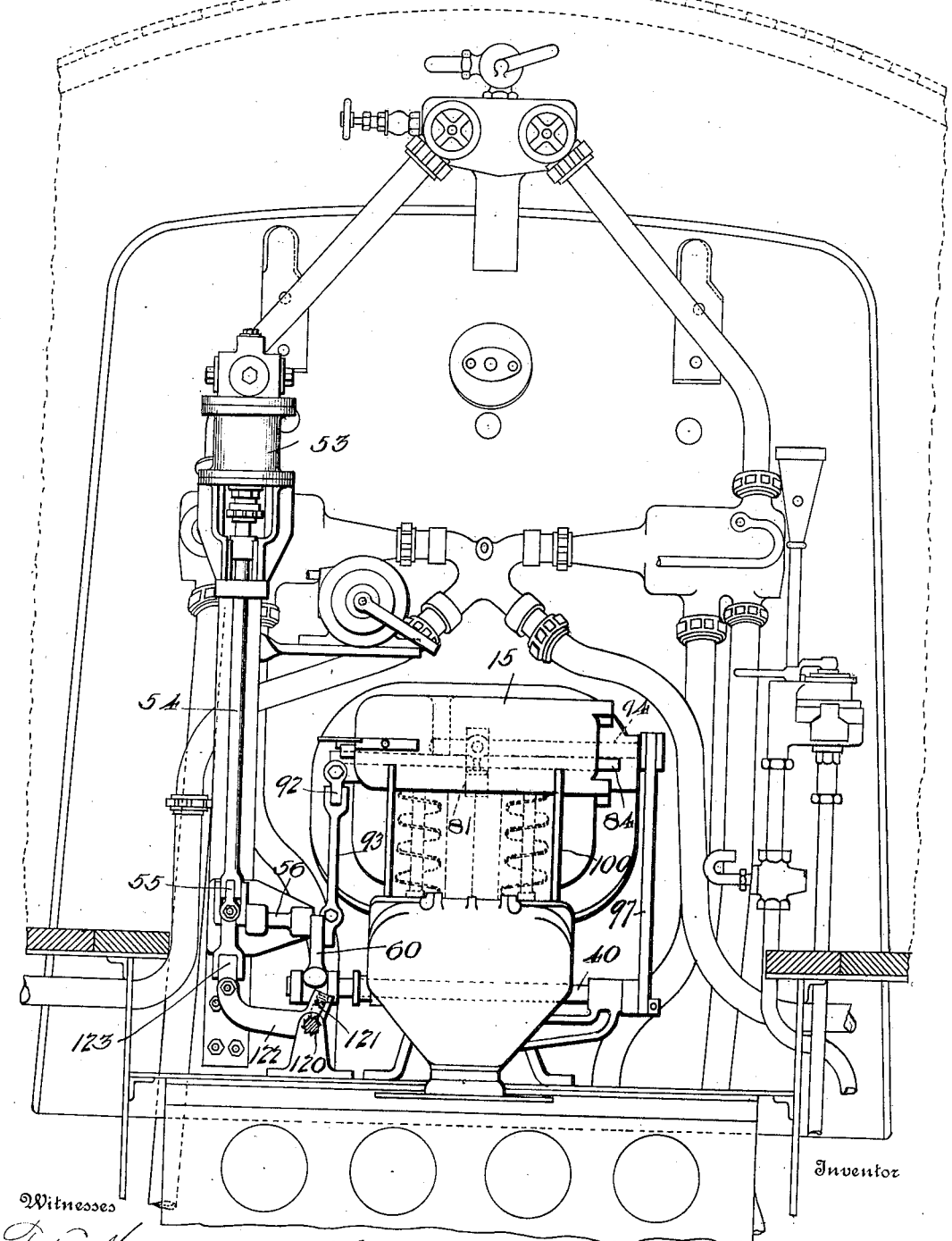

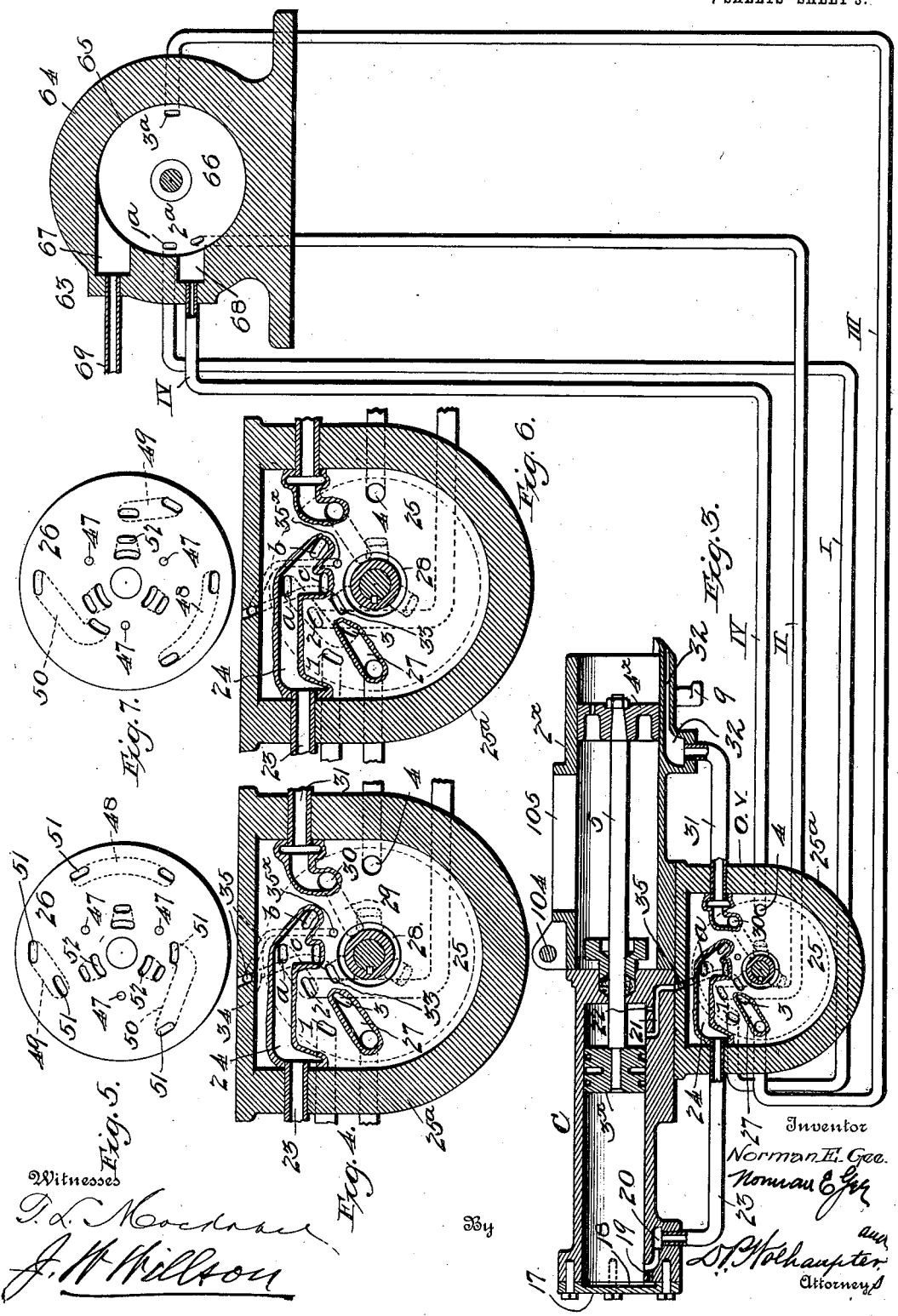

No. 847,174.  
PATENTED MAR. 12, 1907.

N. E. GEE.  
MECHANICAL STOKER.  
APPLICATION FILED MAY 7, 1906.

7 SHEETS—SHEET 4.

Witnesses  
Inventor  
Norman E. Gee  
By  
Attorneys

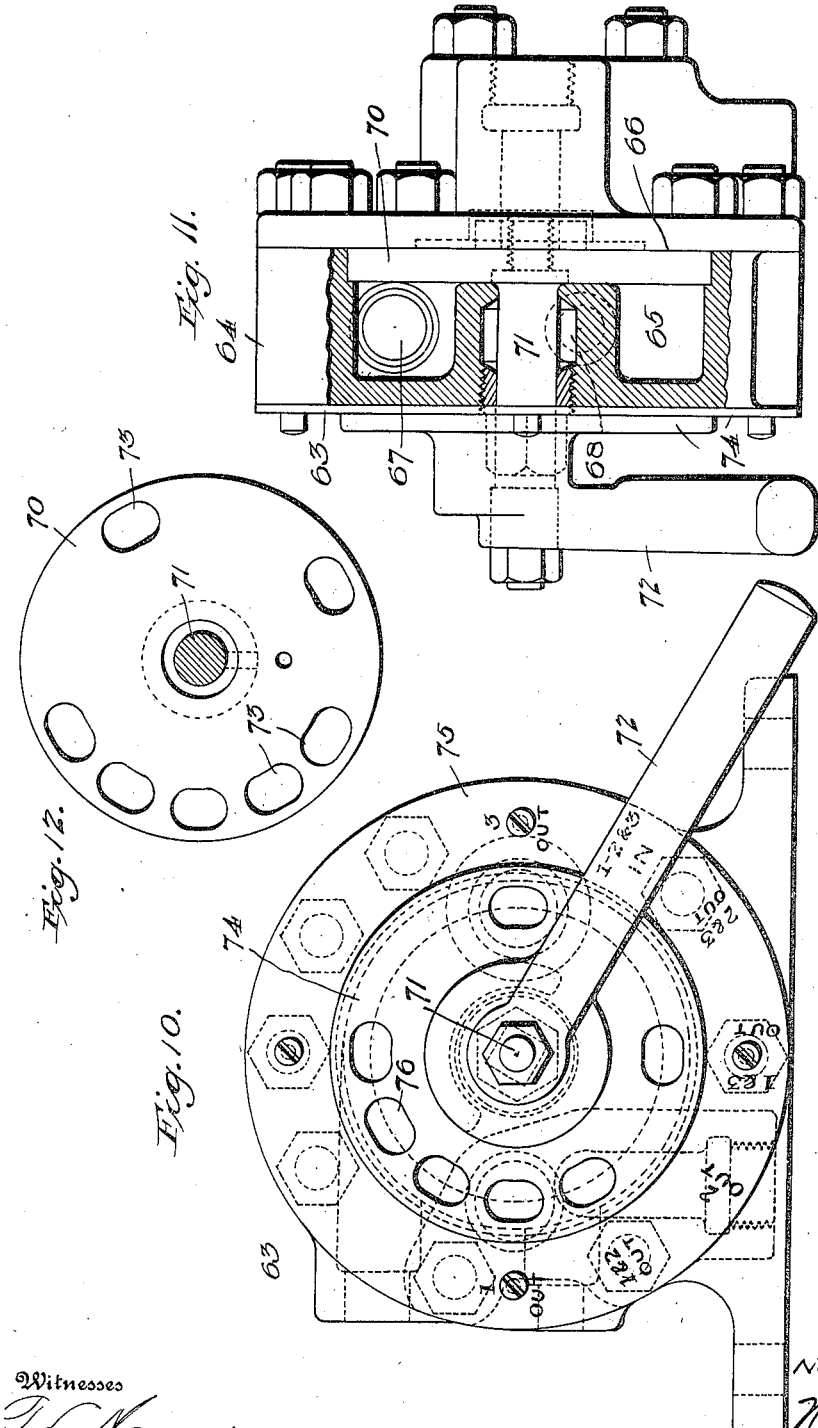

No. 847,174. PATENTED MAR. 12, 1907.
N. E. GEE.
MECHANICAL STOKER.
APPLICATION FILED MAY 7, 1906.
7 SHEETS—SHEET 6.
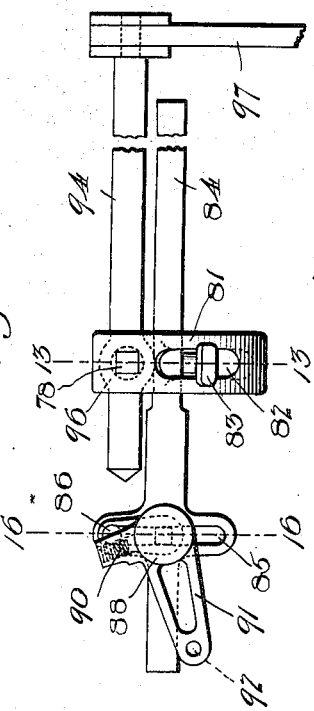
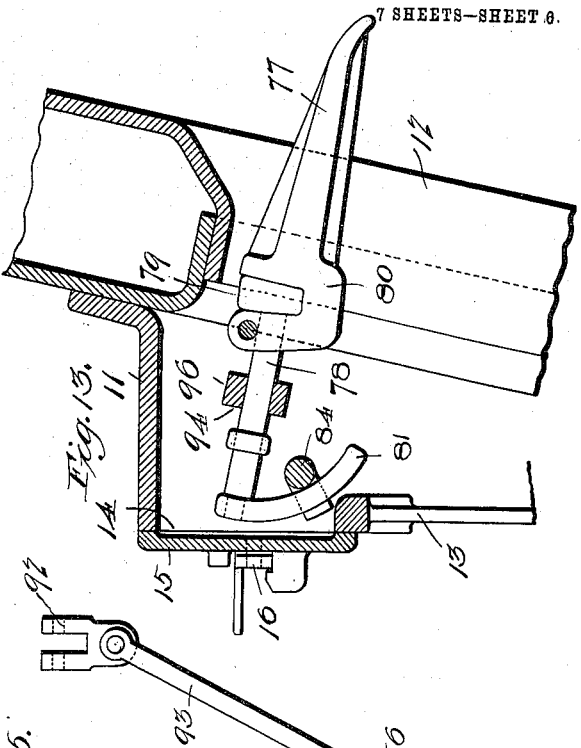
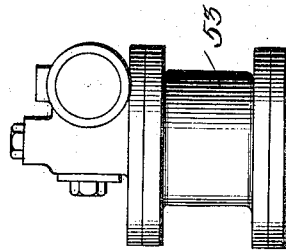
Witnesses
T. L. Moshure
J. W. Willson
Inventor
Norman E. Gee
By
Norman E. Gee.
D. T. Holhaupter
Attorneys No. 847,174.

PATENTED MAR. 12, 1907.

N. E. GEE.
MECHANICAL STOKER.
APPLICATION FILED MAY 7, 1906.

7 SHEETS—SHEET 7.

Witnesses

Inventor
Norman E. Gee
By
Attorneys

UNITED STATES PATENT OFFICE.

NORMAN E. GEE, OF ALTOONA, PENNSYLVANIA.

MECHANICAL STOKER.

No. 847,174.   Specification of Letters Patent.   Patented March 12, 1907.

Application filed May 7, 1906. Serial No. 315,542.

*To all whom it may concern:*

Be it known that I, NORMAN E. GEE, a citizen of the United States, and residing at Altoona, in the county of Blair and State of Pennsylvania, have invented certain new and useful Improvements in Mechanical Stokers, of which the following is a specification.

This invention relates to mechanical stokers of the type primarily designed for stoking or firing locomotive-furnaces.

To this end the invention contemplates a mechanical locomotive-stoker having an automatic action and at the same time embodying a selective principle which provides means whereby the fuel-feeding position on or over the grate may be selected at the will of the fireman, so that the fuel may be deposited or delivered at the point where needed. Also in this connection the invention has in view improved means whereby the operations of all the various mechanisms of the stoker are under the control of the fireman from a single controlling device or valve, which device enables the fireman to not only select the fuel-feeding position on the grate, but also to blank or omit feeding any portion of the grate-surface which does not require replenishing of fuel. In carrying out the last-named object the invention is intended to meet that condition where the fire will cut through in spots on the grate largely on account of the effect of the exhaust. It is well known that when engines are working on heavy grades and pulling heavy trains the exhaust and draft will cut through the fire so badly as to bare the grates of fuel at the points in the fire-box where the fuel is most needed. This condition is not corrected by any type of locomotive-stoker known to this applicant and cannot be met by some types of stokers already patented—such, for instance, as those employing a stoking-engine driving a stoking-head and which have a variable or accelerating stroke. A stroke of this character has been found by practical demonstration to be entirely inadequate to meet those conditions above pointed out and, furthermore, will not provide for reliably spreading the fuel over the grate-surface even in a straight direction from the front to the back wall of the fire-box.

A further object of the invention is to provide a novel relation of mechanisms whereby the fuel will be taken from the tender coal-supply and deposited in front of the stoking-head of the stoker in a fixed ratio to the amount that is forced into the fire-box; also, to provide means by which the stoking-head of what may be termed the "stoking-engine" is operated in a fixed ratio to the number of strokes of the driving-engine, thus controlling the number of strokes of the stoking-head by opening or closing the throttle of the driving-engine, the same operation also controlling the amount of fuel delivered from the coal-supply in the tender.

Another object of the invention is to equip the stoking-engine with an improved type of rotary valve, comprising means for admitting and exhausting steam to and from both sides of the stoking-engine piston and bearing a complemental relation to a single controlling-valve, which comprises means for controlling all of the strokes of the stoking-engine, so that the latter may be made inoperative or operative for any of the main positions of the deflector.

Another distinctive feature resides in the employment of an automatically-operating deflector coöperating with the stoking-engine and having a compound movement—that is, a vertical swinging movement on a horizontal axis—to deflect the fuel to the front, middle, and back of the fire-box—and also a lateral rocking movement on its longitudinal axis, whereby the fuel is deflected to the ends and corners of the fire-box.

As a general object the invention provides a means for utilizing the slack coal, as well as the lumps, also to reduce to a minimum the amount of cold air that enters the fire-box above the grate, and thereby protect the flue-sheets from cracking, and, furthermore, to promote complete combustion through the synchronous action of the controlling-valve and the deflector-plate, all of which provide means whereby an even and high pressure can be carried upon locomotive-boilers, thus reducing the strains that arise in boilers from changes in temperature.

With these and many other objects in view, which will be readily apparent to steam and railroad engineers, the invention consists in the novel construction, combination, and arrangement of parts hereinafter more fully described, illustrated, and claimed.

The essential features of the invention involved in carrying out the objects above indicated are necessarily susceptible to a wide range of structural modifications without departing from the scope of the invention; but a practical embodiment thereof is shown in the accompanying drawings, in which—

Figure 9:
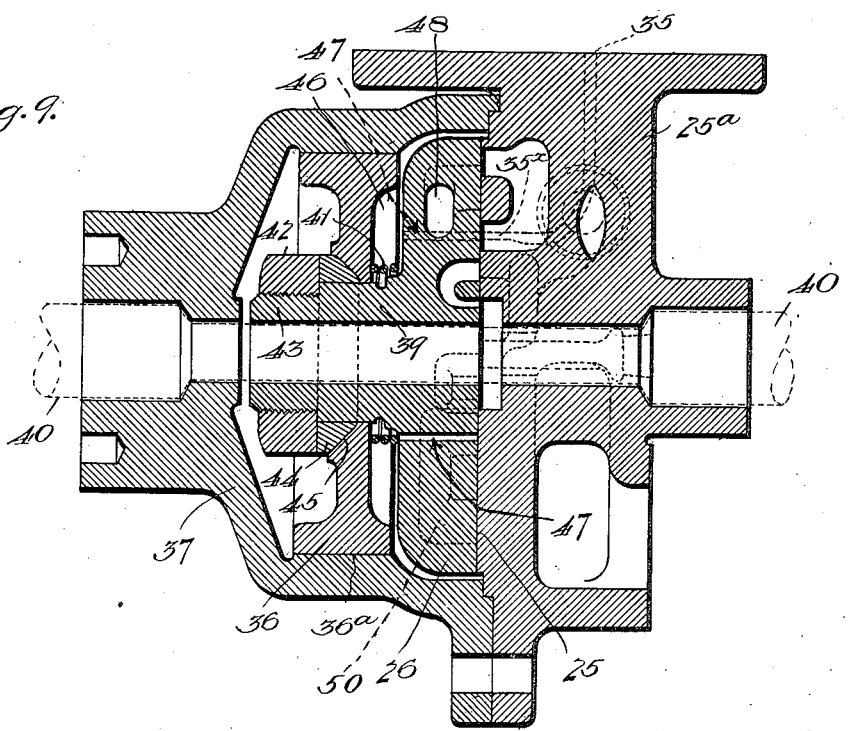
Figure 17:
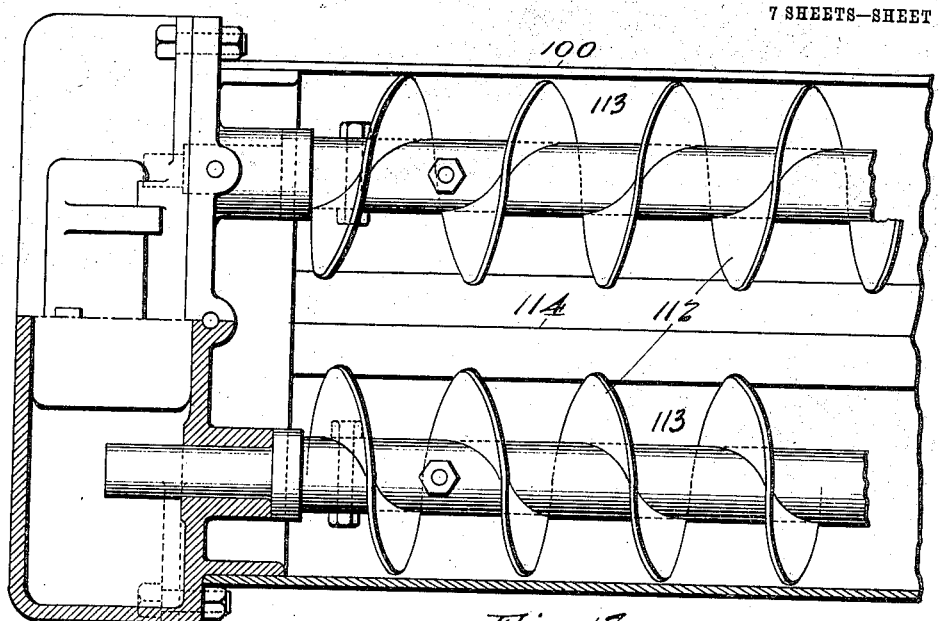
Figure 18:
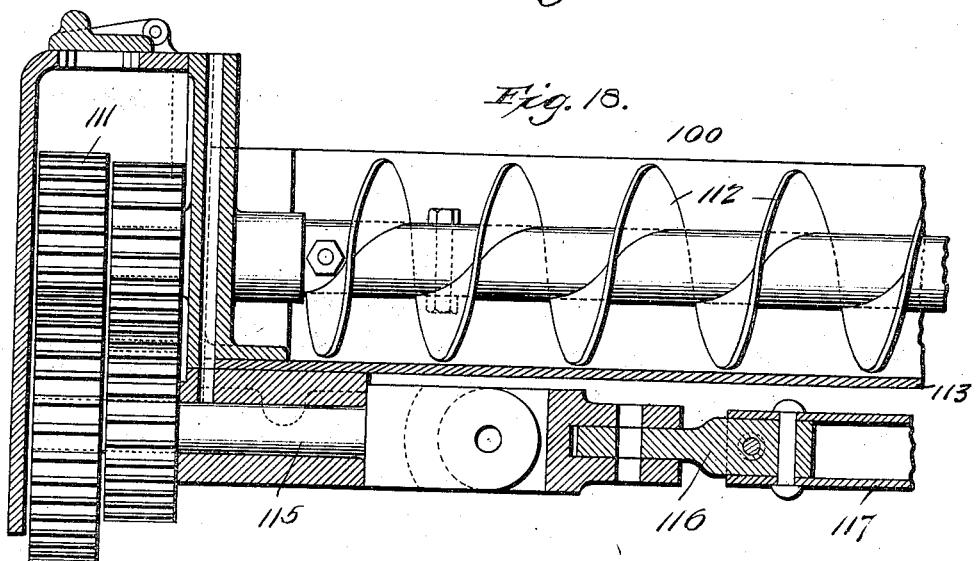
Figure 19:
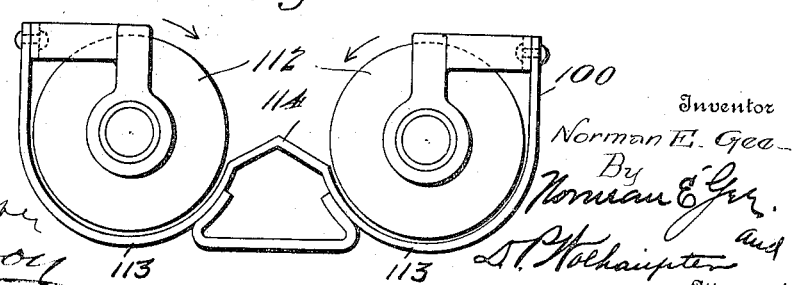

Figure 1 is a side view, partly in section, showing the complete stoking apparatus applied to a locomotive-furnace and its tender. Fig. 2 is an end view of the same construction. Fig. 3 is a sectional diagrammatic view of the stoking-engine, the operating-valve, the controlling-valve, and the pipe connections. Fig. 4 is a sectional diagrammatic view of the valve-seat part of the operating-valve, showing a second position for the latter. Fig. 5 is a plan view of the operating-valve arranged in a correctly-projected position in relation to Fig. 4. Figs. 6 and 7 are views similar to Figs. 4 and 5, illustrative of a third position for the operating-valve. Fig. 8 is a top plan view, partly in section, of the operating-valve to illustrate the course of live steam for supplying the steam-spaces between the operating-valve and its balance-disk. Fig. 9 is a vertical transverse sectional view of the operating-valve on the line 9 9 of Fig. 8. Fig. 10 is a front elevation of the controlling-valve. Fig. 11 is a side view, partly in section, of the said controlling-valve. Fig. 12 is a detail elevation of the controlling-valve disk. Fig. 13 is an enlarged detail sectional view showing the mounting of the deflector-plate, the line of section being indicated by the line 13 13 of Fig. 14. Fig. 14 is a detail elevation of the main portion of the deflector-operating mechanism. Fig. 15 is a detail view showing certain of the operating connections with the driving-engine. Fig. 16 is a detail sectional view on the line 16 16 of Fig. 14. Fig. 17 is a top plan view, partly in section, of the receiving end portion of the fuel-conveyer. Fig. 18 is a vertical sectional view of the same part of the fuel-conveyer. Fig. 19 is a top end view of the fuel-conveyer.

Like references designate corresponding parts in the several figures of the drawings.

In carrying out the present invention the same embodies in its general organization a series of related and synchronously-operating mechanisms designed to be arranged in operative relation to the coal-supply in the tender and to the fire-door or fire-door opening of the locomotive-furnace. These mechanisms are, in the main, a stoking-engine comprising means for forcibly pushing a supply of fuel through the fire-door opening of the locomotive-boiler, a fuel-supply mechanism comprising a coal-handling system for automatically receiving the fuel from the tender and delivering the same to the fuel-chute of the stoking-engine, an operating-valve for the stoking-engine, a deflector device operatively connected with the operating-valve, a driving-engine operatively connected with the fuel-supply mechanism, with the operating-valve, and also with the deflector device, and a controlling-valve having a complemental relation to said operating-valve.

The stoking-engine constitutes the active mechanism for forcibly pushing or throwing the supply of fuel into the fire-box, and said stoking-engine essentially comprises as its principal instrumentalities an engine-cylinder C, a fuel-chute $2^\times$, united to and longitudinally alined with the cylinder, a piston-head $3^\times$ within the cylinder, a stoking-head $4^\times$ within the fuel-chute, a common piston-rod 5, connecting the heads $3^\times$ and $4^\times$, and an operating-valve device, (designated in its entirety by the abbreviations "O. V.") This stoking-engine is preferably arranged in an inclined position above the deck-plate 7 of the locomotive, the cab, part of which, including the back end of the locomotive-furnace, is designated by the reference L. The support of the engine in that position may be effected by any suitable means, such as a supporting-pedestal 8 on the deck-plate 7 beneath the engine-cylinder C, and a fastening-lug 9, preferably rigid with the front end portion of the fuel-chute 2 and detachably interlocking in a shouldered keeper-seat 10, formed in the lower end portion of a casting or frame 11, which may be termed an "interchangeable fire-door frame." This fire-door frame is a casting having the necessary bearings and supports for certain parts of the deflector device, hereinafter more particularly referred to; but at this point it is to be noted that for purposes of convenience and economy the said fire-door frame 11 is interchangeable with the ordinary standard locomotive fire-doors and frames and is adapted to replace the latter and be secured to the front of the fire-box as a hood directly over the fire-door opening 12 therein. As indicated, the said fire-door frame is in the form of a hood and is provided in the lower portion thereof with a stoking-opening 13, which receives and is substantially closed by the front discharging end of the fuel-chute $2^\times$, while above the plane of said opening 13 the hooded fire-door frame 11 is provided with a secondary access-opening 14, closed by a door 15, preferably equipped with an observation-wicket 16. The combined door and wicket 15 16 permit of the raking of the fire, if necessary, and also the convenient observation thereof.

Reverting to the stoking-engine, which is arranged with its fuel chute or chamber $2^\times$ in line and in communication with the stoking-opening 13 of the fire-door frame, it will be observed that the engine-cylinder C is of conventional form, though so constructed as to provide for cushioning the stroke of the piston-head $3^\times$ at each end thereof. At its forward end this cushioning is provided for in the manner to be presently explained, and at the back end the cylinder is fitted with the back cylinder-head 17, provided at its inner side with a steam-cushion chamber 18, which receives and holds sufficient steam for cushioning the head $3^\times$ on its back or return stroke. Also in carrying out the invention the steam-chamber 18 in the back head is in communication with a starting-port 19, formed in the cylinder-shell, and in communication with the rear supply and exhaust port 20, which opens into the cylinder near the back head thereof. In substantially a corresponding position at a distance from its front end the cylinder is provided with a front supply and exhaust port 21, cored in the shell of the cylinder and also having branched therefrom a starting-port 22 in communication with the cylinder at the extreme front end thereof, as plainly shown in Fig. 3 of the drawings.

The rear supply and exhaust port 20 for the stoking-engine cylinder has connected therewith a steam supply and exhaust pipe 23, which receives and exhausts steam for the back end of the cylinder C in connection with a main supply and exhaust passage 24, suitably formed in the valve-base $25^a$ of operating-valve device O V, previously referred to. The said main supply and exhaust passage 24 opens through the valve-seat 25 of the operating-valve device O V through a plurality of branch ports, which for convenience in describing the operation of the valve may be designated, respectively, as branch ports $a$, $b$, and $c$. These ports open through the valve-seat 25 and coöperate with the several ports in the operating-valve disk 26, to be presently referred to. In addition to the main supply and exhaust passage 24 and the branch ports in communication therewith the valve base and seat are pierced by a plurality of supply-ports 1, 2, and 3, respectively, which correspond to and bear a complemental relation to corresponding ports in the controlling-valve hereinafter described. In addition to the port-hole itself one of said supply-ports—namely, that designated by the numeral 3—has a short extension-passage 27, leading through the valve-base to the pipe-opening for the pipe connecting with the controlling-valve, and at this point it may be observed that each of said supply-ports 1, 2, and 3, has associated therewith a separate steam-supply pipe, said several pipes being designated, respectively, I, II, and III.

In further explanation of the various ports of the operating-valve seat $25^a$ it is to be noted that the seat is provided with a central main exhausting-cavity 28, having a passage connection 29 with a main exhaust-port 30, piercing the seat and in communication with the common exhaust-pipe 31, which leads from the valve-base $25^a$ to an exhaust-discharge passage 32, preferably cored out of the front end portion of the fuel-chute $2^\times$ at the lower side thereof whereby the exhaust-steam may be discharged directly into the fire-box, thus disposing of the same in the most desirable way.

In connection with the central main exhausting-cavity 28 the valve-seat is also provided in spaced relation to said cavity with a cylinder-exhaust port 33, in communication with an exhaust-passage 34, formed in the valve-base and communicating with the front supply and exhaust port 21 for the front end of the engine-cylinder. This port or passage 21 is likewise in communication with a supply-passage 35, extending through the top portion of the valve-base $25^a$ and serving to conduct live steam to the said port or passage 21 from the space between the valve-disk 26 and the valve-balance disk 36, arranged at one side of the valve-disk and housed within the valve-balance chamber 37, which likewise constitutes a casing or chamber for closing the valve proper, 26. The space between the elements 26 and 36 communicates with a steam-circulating channel 38, formed around the outer edge or periphery of the valve proper, and the latter in turn is in communication with a live-steam port 4, which receives its supply of steam from a steam-supply pipe IV, connecting with a suitable port of the controlling-valve, as hereinafter more fully pointed out.

The valve proper or valve-disk 26 is free to rotate upon its seat $25^a$ at one side of the valve-base $25^a$, and said valve is provided with a hub-sleeve 39, fitted on the valve-operating shaft 40 and receiving thereon the valve balance disk 36, whose periphery has a steam-tight fit at $36^a$ upon the inner wall of the valve-balance chamber 37. In order to maintain the proper spaced relation between the two disks 26 and 36, a pressure-spring 41 is interposed therebetween, and the balance-disk 36 is adjusted against said spring through the medium of an adjusting-nut 42, working on the threaded shank 43 of the hub-sleeve 39 and bearing against a half-ball joint-ring 44, registering in a correspondingly-shaped joint-seat 45, formed in one side of the balance ring at the central portion thereof. In connection with this part of the invention it will be observed that the admission of steam into the space between the valve-disk and the balance-disk through the circulating-channel 38 provides a means of balancing the operating-valve 26, thereby obviating any difficulty that might arise from excessive pressure on one side only. Also the construction described embraces the novel idea of provision for taking up any unequal wear on the valve or its seat.

Referring to the action of the valve proper or the valve-disk 26 in controlling the steam in connection with the various ports in the valve-seat, it may be first observed that the live steam in the live-steam chamber 46 between the valve-disk 26 and the balance-disk 36 is led from such chamber to the intake of the passage 35, which pierces the valve-seat at 35ˣ, (see Fig. 9,) through any one of the live-steam ports 47, transversely piercing the valve-disk 26 and extending entirely through the same. The valve proper or the valve-disk 26 is furthermore provided in the body portion thereof with a cycle of bridging-passages 48, 49, and 50, respectively, which are cored out through the valve-body and are provided at their opposite extremities with the surface ports 51, opening through the face of the valve-disk. These bridging-passages are arranged at such angles and in such positions as to coöperate, respectively, with the supply-ports 1, 2, and 3 and with the main supply and exhaust passage 24 in the manner to be presently explained. Also the valve-disk is provided within the central portion thereof with a plurality of concentric exhaust bridging-passages 52, arranged in regularly-spaced relations and serving to connect the cylinder-exhaust port 33 with the central exhausting-cavity 28 when the line of exhaust is completed for the steam in front of the piston-head of the stoking-engine.

The valve-shaft 40, carrying the valve proper or valve-disk 26, is intermittently rotated through the action of a driving-engine 53. This engine is of a common standard construction and is not specially claimed herein; but it is to be observed that the said engine is arranged in a convenient position upon the locomotive and receives its supply of steam from a suitable pipe-connection with the locomotive steam-supply. In connecting this driving-engine with the mechanisms of the stoking apparatus the piston-rod 54 thereof has a rock-arm connection 55 with a suitably-supported motion-transmitting rock-shaft 56, carrying a bell-crank 57, to one arm of which is pivotally connected a pitman 58, the other end of which is pivotally connected, as at 59, to a swinging ratchet-arm 60, carrying a spring-pressed ratchet-dog 61, engaging the ratchet-toothed section 62, formed upon or carried by the operating-valve shaft 40. This line of connections with a predetermined number of teeth on the ratchet-section 62 provides for rotating the operating-valve 26 a prescribed distance at each stroke of the driving-engine.

The supply of steam to the operating-valve device or valve mechanism O V is controlled through the medium of a single controlling-valve, (designated in its entirety by the number 63 and arranged in a convenient position within the cab of the locomotive, so as to be within convenient reach of the fireman.) This controlling-valve comprises in its general organization a valve-casing 64, provided therein with an interior steam-chamber 65, at one side of which chamber is arranged a valve-seat 66, which is pierced with a plurality of feeding-ports 1ª, 2ª, and 3ª, bearing a complemental relation to the supply-ports 1, 2, and 3 of the operating-valve seat and in communication with the pipe-openings, respectively, for the steam-supply pipes I II III. Also the said valve-casings 64 is provided at one side of the plane of the valve-seat 66 with steam inlet and exhaust openings 67 and 68, respectively, both of which are in free communication at all times with the interior steam-chamber 65. The inlet-opening 67 has a main supply-pipe connection 69 therewith, which receives its supply of steam from the dome or piping system of the locomotive and, like the supply-pipe for the driving-engine 53, is designed to be equipped with its own throttle or cut-off valve when the apparatus is not in use. The other of said openings—namely, the steam-exhaust opening 68—is in communication with the steam-supply pipe IV, which supplies steam to the engine-cylinder C.

The feeding-ports 1ª, 2ª, and 3ª of the valve-seat 66 for the controlling-valve are designed to be covered and uncovered and to be selected singly, in pairs, or in groups through the employment of a controlling-valve disk 70, mounted on a controlling-valve stem 71, journaled in suitable bearings provided in and on the valve-casing 64 and carrying exterior to the latter a controller-handle 72 for the fireman. The said valve-disk 70 is arranged within the interior steam-chamber 65 and with the seat 66, in effect, constitutes one of the sides of said chamber. The disk 70 is provided therein with a series of selecting-ports 73, which are arranged in a larger number than the feeding-ports of the valve-seat 66 and in such order that said feeding-ports can be covered and uncovered singly, in pairs, or in groups at the option of the fireman, according to the requirements of the fire. This selection of the feeding-ports to bring into play is controlled through the medium of an indicator-disk 74, carried by the controller-handle 72 and working on the exterior of the valve-casing 64 at one side of or over a marked indicating-dial 75. Preferably the indicator-disk 74 is provided with dummy ports 76, corresponding exactly with the selecting-ports 73 of the valve-disk 70 and marked in correspondence with the dial 75, so that the operator can tell at a glance which feeding-ports are cut in or blanked, and thereby always know what grate positions are being supplied with fuel by the stoking apparatus.

A distinctive feature of the present invention resides in the employment of a deflector device, including a deflector 77, arranged for operation within the fire-door opening 12 in line with the discharge of fuel from the fuel-chute 2ˣ. The deflector 77 has a compound movement—that is, a vertical swinging movement on a horizontal axis to deflect the fuel to the front, middle, and back of the fire-box and also a lateral rocking movement on its longitudinal axis whereby the fuel is deflected to the ends, sides, and corners of the fire-box. The said deflector or deflector-plate 77 may be characterized as being of a partial spoon form, and the main vertical movements thereof are kept in synchronism with the intermittent movements of the operating-valve disk 26 and with the strokes of the stoking-engine—that is, for each forward stroke of the stoking-engine and its stoking-head the deflector has one main position, so that with three constant strokes of the stoking-head of equal strength or force and each of said strokes being a fuel-feeding stroke the deflector will intermittently assume its three main positions for respectively feeding and distributing the fuel respectively to the front, middle, and back of the fire-box. In addition to these main movements the deflector is constantly rocking sidewise, or on its longitudinal axis, so that the fuel is deflected to the sides and corners of the fire-box.

The above various movements of the deflector are accomplished through a deflector-operating mechanism, which includes a carrier-rod 78, provided with a head member 79, detachably interlocked with a bifurcated locking-hook 80, formed at the outer end of the deflector-body and providing means for rigidly connecting the latter with the carrier-rod 78. The said rod extends rearward from its connection with the deflector and has fitted to the rear end thereof an arcuate motion-link 81, provided therein with a longitudinal-disposed slot 82, slidably receiving the headed connecting-pin 83 of a reciprocating operating-rod 84. This rod is supported to reciprocate horizontally and is provided contiguous to one end thereof with a slotted cross-head 85, receiving the wrist-pin 86 of a crank-arm 87, carried at one end of a ratchet-bolt 88, provided thereon with a ratchet-toothed portion 89, engaged by the spring-pressed dog 90 of a swinging ratchet-arm 91, mounted to oscillate upon the bolt 88. The said ratchet-arm 91 has a gimbal-joint connection 92 with one end of an operating-pitman 93, the other end of which pitman connects with one arm of the bell-crank 57, carried by the motion-transmitting rock-shaft 56.

The reciprocation of the rod 84 swings the link 81 and rocks the deflector sidewise, while the up-and-down swing of the latter is imparted thereto through a horizontal operating rock-shaft 94, journaled in suitable bearings in the fire-door frame and provided at an intermediate point with a bearing-collar 96, which permits the carrier-rod 78 to rock or turn therein, while at the same time causing said rod to be moved up and down with the deflector as the shaft 94 is rocked.

The rocking of the shaft 94 is accomplished through the medium of a connecting-pitman 97, one end of which is connected to a crank-arm 99 on one end of the operating-valve shaft 40 and the other end of which is connected to a crank-arm 98 on one end of the rock-shaft 94, thus providing a connection which synchronizes the movements of the operating-valve and of the deflector.

Another distinctive feature of the invention resides in the necessary employment of a fuel-supply mechanism comprising a coal-handling system for automatically receiving the fuel from the tender and delivering the same to the fuel-chute of the stoking-engine. This fuel-supply mechanism includes in its general organization an inclined conveying-trough 100, extending from the tender T in rear of the locomotive L and bridging the interval between the same and overlying the stoking-engine. In order that this conveying-trough 100 may freely accommodate itself to the movements of the locomotive and tender and always maintain a proper feeding position, the said chute has fitted to the rear end thereof a bearing lug or projection 101, loosely resting on a stationary fulcrum-post 102, mounted on the floor of the tender, and the corresponding front end portion of the conveying-trough has fitted thereto a bearing plate or rib 103, which loosely rests on a roller-support 104, mounted on the upper side of the fuel-chute $2^\times$ at one side of a receiving-opening 105, formed in the top side of said chute and beneath which the stoking-head operates. The front end portion of the conveying-trough 100, which is thus loosely supported on top of the fuel-chute, has fitted thereto at the sides the pendent guard-aprons 106, which prevent scattering of the fuel and compel the same to fall into and through the receiving-opening 105 of the fuel-chute.

In order to properly shield the receiving end of the conveying-trough 100 and at the same time insure the feeding of fuel into the same, there is built or fitted within the tender-body upon the floor of its tank a raised inclined conveyer shield-plate 107. This shield-plate constitutes a bottom for the fuel-compartment of the tender and is arranged to overlap the lower rear end of the conveying-trough. Near its higher end the said shield-plate is provided with a feed-opening 108, through which the fuel falls into the trough, and in rear of the said opening 108 the shield-plate is further provided with a door-covered access-opening 109, through which access may be had, if necessary or desired, to the interior of the gear-case 110, arranged at the lower end of the conveying-trough and accommodating therein the spur-gearing 111, employed for driving the pair of helicoid rotary conveyers 112, mounted within the opposite gutters 113 of the conveying-trough. A dividing-rib 114 of slight projection rises from the floor of the trough between the two conveyers and serves materially to prevent clogging of the fuel. Also the gearing 111 is so arranged as to turn the two conveyers toward the center, so that the fuel moves in a center column free from danger of clogging or choking toward the upper discharging end of the trough.

One of the gears of the gearing has a stub-shaft connection 115, with a gimbal-joint 116, which in turn connects with a driving-shaft section 117, having a telescopic connection 118, with a driving-shaft section 119. This latter shaft-section is provided with a ratchet-toothed section 120, engaged by the spring-pressed dog 121 of a swinging ratchet-arm 122, having an operating-link connection 123 with the lower end portion of the reciprocating piston-rod 54 of the driving-engine 53. In connection with this construction it is to be noted that the driving-ratchets for the fuel-supply mechanism and for the operating-valve are provided with a like number of teeth, so as to insure synchronous operation and a constant fuel-supply to the stoking-engine and from the latter into the fire-box.

The mechanical action of the different parts of the stoker apparatus having been explained, the selective operation thereof will be readily understood by reference to the group of Figs. 3 to 7, inclusive. In the first place, assuming that the driving-engine 53 is operating and the steam is turned onto the controlling-valve through the supply-pipe 69, the steam will fill the interior steam-chamber 65 of the controlling-valve casing and will have free access to the steam-supply pipe IV and thence to the live-steam port 4 in the valve-base 25ª of the operating-valve. From this port 4 the steam passes through the steam-circulating channel 38 (see Fig. 8) into the steam-chamber 46 between the valve-disk 26 and the balance-disk 36. In connection with this steam circulation it will be observed by reference to Figs. 3 and 9 of the drawings that as a live-steam port 47 of the operating valve-disk comes into registration with the port 35×. From this port the live steam passes into and through the passage 35, 21, and 22 into the front end of the engine-cylinder, so as to retract the piston-head to the rear end of the cylinder ready to receive the impact of steam first from the starting-port 19 and then from the main rear end port 20. Of course this action of the valve 26 to bring a port 47 into play is always in advance of the operation of the valve to admit live steam to the cylinder-pipe 23. Whenever the piston-head 3× is thrust forward, the supply of live steam is cut off from the front of the engine-cylinder by the position of the valve 26, and at the same time such position of said valve will bring one of the exhaust bridging passages 52 thereof into registration with the central main exhausting-cavity 28 and the cylinder exhaust-port 33, thereby establishing a direct line of exhaust from the front of the cylinder through the passage connection 29, the main exhaust-port 30, and the common exhaust-pipe 31. Under all conditions this feeding and exhausting of the front end of the stoking-engine cylinder is the same, and, referring now particularly to the selective operation, it may be assumed that the controlling-valve 70 has been set to cut in all of the feeding-ports 1ª, 2ª, and 3ª, thus feeding steam into all of the supply-pipes I II III. This means that each of the three main positions of the operating-valve will be an active one and will provide for one full feeding stroke of the stoking-engine. Taking up the cycle of operation in order, it may be assumed that the piston-head 3× is retracted, so that when the No. 1 selective bridging passage 48 comes into operative position (see dotted line in Fig. 3) the same will bridge the valve-supply port 1 and the branch port a of the passage 24 in communication with the cylinder-pipe 23. This admits steam behind the piston-head and thrusts the same, with the stoking-head, forward to make one stroke. While this is occurring the front end of the cylinder is exhausting through the line of exhaust already referred to. Then as the operating-valve continues to rotate another live-steam port 47 comes into play to return the piston-head and at the same time the selective bridging passage 48 for the No. 1 position connects the branch port a with the main exhaust-port 30 and establishes a line of exhaust from behind the piston as it returns to its starting position. Next the bridging passage 49 connects the supply-port No. 2 with the branch port a (see Figs. 4 and 5) to provide for the second forward stroke of the engine, and that is followed by the bridging of branch port b by the passage 49 with the main exhaust-port 30 for exhausting the steam used in such second stroke. The last operation of the cycle of movement for the operating-valve is that of the bridging passage 50, connecting supply-port 3 with the branch port a, and its subsequent bridging of branch port c and the main exhaust-port 30. If it is desired to blank any one or more of these operations, it is simply necessary to turn the controlling-valve to a position for blanking the corresponding feeding-ports in the seat thereof.

For each of the constant strokes of the stoking-engine the deflector, through its connection with the operating-valve, occupies one deflecting position in its vertical swing, so that each of the ports 1, 2, and 3 represents one of the main feeding positions for the deflector. Hence any of these positions can be cut in or out by the simple adjustment of the controlling-valve. Of course in all of the main positions of the deflector the latter is being constantly rocked from left to right and from right to left on its longitudinal axis, with the result of deflecting the fuel to the sides and corners of the fire-box as well as to the front, middle, and back thereof, as may be desired by the operator.

In carrying out the invention it will of course be understood that the stoking-engine may be operated not only with steam, but also with any equivalent operating medium, such as compressed air.

I claim—

1. In a stoker, a stoking-engine, a device so constructed as to operate the engine for feeding fuel to various parts of a fire-box, and a single device adapted to control the action of said first device and to select the part to be fed.

2. In a stoker, a stoking-engine, a device so constructed as to operate the engine for feeding fuel to various parts of the fire-box, and a manually-operated device adapted to control the action of said first device and to select the part to be fed.

3. In a stoker, a stoking-engine, an operating-valve so constructed as to operate the engine for feeding fuel to various parts of a fire-box, and a single device adapted to control the action of said valve and to select the part to be fed.

4. In a stoker, a stoking-engine, a device so constructed as to operate the engine for feeding fuel to various parts of a fire-box, and a controlling-valve adapted to control the action of said device and to select the part to be fed.

5. In a stoker, a stoking-engine, an operating-valve so constructed as to operate the engine for feeding fuel to various parts of a fire-box, and a controlling-valve adapted to control the flow of the operating medium to the operating-valve and to select the part to be fed.

6. In a stoker, a stoking-engine, an operating-valve so constructed as to operate the engine for feeding fuel to various parts of a fire-box, and a separate manually-operated controlling-valve adapted to control the flow of the operating medium to the operating-valve and to select the part to be fed.

7. In a stoker, a stoking-engine, a device so constructed as to operate the engine for feeding fuel to various parts of the fire-box, a single device adapted to control the action of said first device and to select the part to be fed, and an automatically-adjusted deflector.

8. In a stoker, a stoking-engine, an operating-valve so constructed as to operate the engine for feeding fuel to various parts of a fire-box, a controlling-valve adapted to control the flow of the operating medium to the operating-valve and to select the part to be fed, and a deflector operated from said operating-valve.

9. In a stoker, a stoking-engine having an operating-valve, and a deflector operated from said valve.

10. In a stoker, a stoking-engine having an operating-valve, a vertically-swinging and laterally-rocking deflector having an operative connection with said valve for imparting to the deflector its vertically-swinging movement, and means for imparting to the deflector its lateral rocking motion.

11. In a stoker, the combination with a furnace, of a stoking-engine having a rotary operating-valve, a deflector supported within the fire-door opening of the furnace and arranged to swing vertically on a horizontal axis, and to rock laterally on its longitudinal axis, an operating connection between the valve and said horizontal axis for the deflector, and an intermittently-operating connection with the longitudinal axial support for the deflector.

12. In a stoker, a stoking-engine having a rotary valve and strokes of constant force, ratchet driving mechanism for turning said valve, a deflector supported to swing vertically on a horizontal axis and to rock laterally on a longitudinal axis, a fixed operating connection between the valve-shaft and the horizontal axis for the deflector, and an intermittent ratchet-operating mechanism operatively connected with the longitudinal axial support for the deflector.

13. In a stoker, a fire-door frame arranged over the fire-door opening of the furnace, a stoking-engine discharging through said fire-door frame, a deflector supported within the fire-door frame and arranged to swing vertically on a horizontal axis and to rock laterally on a longitudinal axis, a synchronously-operating connection between the stoker and said horizontal axis for the deflector, and an intermittently-operating mechanism connected with the longitudinal axial support for the deflector.

14. In a stoker, a stoking-engine having a fuel-chute, a stoking-head operating in said chute and carried by the piston-rod, a single rotary operating-valve comprising means for feeding and exhausting both ends of the engine-cylinder, and a single controlling-valve comprising means for cutting in and out different fuel-feeding strokes of the stoker-head.

15. In a stoker, a stoking-engine having a piston-operated stoking-head and an operating-valve provided with a plurality of supply-ports arranged in a cycle of movement, and a controlling-valve having feeding-ports in complemental relation to said supply-ports, and also having means for selecting or blanking any of said ports.

16. In a stoker, a stoking-engine having a piston-operated stoking-head and a rotary single operating-valve provided with a plurality of supply-ports arranged in a cycle of movement for separately supplying steam for different forward strokes of the piston, said operating-valve also being provided with means for feeding and exhausting the forward end of the engine-cylinder, and a controlling-valve having feeding-ports in complemental relation to said supply-ports, and also having means for selecting or blanking any of said ports.

17. In a stoker, a stoking-engine having a fuel-chute provided with a steam-exhaust discharge, a piston-operated stoking-head working in said chute, and an operating-valve having a common exhaust through said exhaust-discharge and provided with a plurality of supply-ports for separately supplying steam for different forward strokes of the piston, said operating-valve being also provided with means for feeding and exhausting the forward end of the engine-cylinder, and a controlling-valve having feeding-ports in complemental relation to said supply-ports, and also having means for selecting or blanking any of said ports.

18. In a stoker, a stoking-engine having a piston-operated stoking-head, a rotary single operating-valve comprising means for feeding and exhausting both ends of the engine-cylinder, a valve balance-chamber covering the operating-valve, a valve balance-disk arranged at one side of the operating-valve within said chamber and adjustable in relation thereto, means for supplying steam between the valve balance-disk and the operating-valve, and a single hand-operated controlling-valve comprising means for cutting in and out different fuel-feeding strokes of the stoking-head.

19. In a stoker, the combination with a locomotive and tender, of a stoking-engine having a fuel-chute and a fuel-handling system comprising a conveyer-trough having a loose bearing-support over both the tender and the locomotive and arranged to deliver fuel into said chute, a pair of screw conveyers operating in said trough, a driving-engine, and a self-adjusting connection between the driving-engine and the conveyers.

20. In a stoker for locomotives, the combination with a tender, of a stoking-engine having a fuel-chute, and a fuel-handling system comprising a conveyer-trough extending from the tender to the locomotive-cab and feeding into said chute, conveyer-screws operating within the trough, an elevated conveyer-shield overhanging the receiving end of the conveyer-trough in the tender, a driving-engine, and a telescopic shaft-line operatively connected with the driving-engine and having a gimbal-joint connection with the rotating means for the screws.

21. In a stoker, a stoking-engine having a rotary operating-valve, a vertically-swinging and laterally-rocking deflector, an operating connection between the operating-valve and the horizontal axis for the deflector, a coal-handling system including a drive-shaft connection therefor, a driving-engine, a ratchet mechanism driven directly from said engine and operating said drive-shaft connection, a separate ratchet-operating connection between said driving-engine and the operating-valve, and another ratchet mechanism between the means for laterally rocking the deflector and said driving-engine.

22. In a stoker for locomotives, the combination with the tender, of a stoking-engine having an operating-valve, a coal-handling system extending from the tender to the stoking-engine, and including a drive-shaft connection, a driving-engine, a ratchet mechanism driven from the driving-engine and operating the drive-shaft connection, and a separate ratchet-operating connection between the driving-engine and the operating-valve.

In testimony whereof I hereunto affix my signature in the presence of two witnesses.

NORMAN E. GEE.

Witnesses:
J. W. WILLSON,
W. H. McCURDY.